US009638373B2

(12) United States Patent
Zhai et al.

(10) Patent No.: US 9,638,373 B2
(45) Date of Patent: May 2, 2017

(54) ENERGY EFFICIENT VERTICAL CRYOGENIC TANK (71) Applicant: Shijiazhuang Enric Gas Equipment Co., Ltd, Shijiazhuang (CN)

(72) Inventors: Lanhui Zhai, Shijiazhuang (CN); Hongxia Wang, Shijiazhuang (CN); Minghui Dong, Shijiazhuang (CN); Xiao'e Pan, Shijiazhuang (CN)

( * ) Notice: Subject to any disclaimer, the term of this patent is extended or adjusted under 35 U.S.C. 154(b) by 0 days.

(21) Appl. No.: 14/443,465

(22) PCT Filed: Jul. 5, 2013

(86) PCT No.: PCT/CN2013/078852
§ 371 (c)(1),
(2) Date: May 18, 2015

(87) PCT Pub. No.: WO2014/121579
PCT Pub. Date: Aug. 14, 2014

(65) Prior Publication Data
US 2015/0330576 A1 Nov. 19, 2015

(30) Foreign Application Priority Data
Feb. 5, 2013 (CN) .................... 2013 2 0065885 U (51) Int. Cl.
*F17C 1/00* (2006.01)
*F17C 13/00* (2006.01)
*F17C 3/08* (2006.01)

(52) U.S. Cl.
CPC .............. *F17C 13/001* (2013.01); *F17C 3/08* (2013.01); *F17C 2201/0104* (2013.01);
(Continued)

(58) Field of Classification Search
CPC ...... F17C 2227/0128; F17C 2227/0135; F17C 2227/0157; F17C 2227/0164;
(Continued)

(56) References Cited

U.S. PATENT DOCUMENTS 5,046,331 A * 9/1991 O'Neal ................. F24F 5/0035
165/163
2010/0276434 A1* 11/2010 Berger ....................... F17C 1/06
220/586
2012/0048881 A1* 3/2012 Drube ....................... F17C 7/02
62/50.1

FOREIGN PATENT DOCUMENTS

CN 201391741 Y 1/2010
CN 202327629 U 7/2011
(Continued)

*Primary Examiner* — Ryan J Walters
*Assistant Examiner* — Erik Mendoza-Wilkenfe (57) ABSTRACT Disclosed herein is an energy efficient vertical cryogenic tank, which comprises a tank body with a vacuum insulation interlayer, wherein the tank body comprises a transmission means including an air return pipe and a liquid outlet pipe, and positioning means including supporting legs provided at the bottom of the tank body, and a built-in saturation adjustment mechanism formed by a heat exchanger connected to an let of the air return pipe and a return air dispersing device. By using a saturation adjustment mechanism at the inlet of the air return pipe, the cryogenic storage tank can not only fully leverage the gasification gas produced at the pump, but also achieve the saturation function of the LNG in the tank, with such benefits as reduced energy loss, simplified tank interface settings, improved efficiency of saturation adjustment, and avoided pump cavitation.

8 Claims, 5 Drawing Sheets (52) U.S. Cl.
CPC .. *F17C 2201/032* (2013.01); *F17C 2201/054* (2013.01); *F17C 2203/01* (2013.01); *F17C 2203/016* (2013.01); *F17C 2203/0391* (2013.01); *F17C 2203/0629* (2013.01); *F17C 2205/018* (2013.01); *F17C 2221/011* (2013.01); *F17C 2221/014* (2013.01); *F17C 2221/033* (2013.01); *F17C 2223/0161* (2013.01); *F17C 2223/033* (2013.01); *F17C 2227/0339* (2013.01); *F17C 2227/0374* (2013.01); *F17C 2260/02* (2013.01); *F17C 2260/031* (2013.01); *F17C 2270/0134* (2013.01); *F17C 2270/05* (2013.01)

(58) Field of Classification Search
CPC ...... F17C 2227/0344; F17C 2227/0306; F17C 2227/0395; F17C 2227/048; F17C 2227/0107; F17C 2265/05; F25J 1/0025
USPC .............................................. 415/58.4, 56.5
See application file for complete search history.

(56) References Cited

FOREIGN PATENT DOCUMENTS

| | | |
|---|---|---|
| CN | 102606883 A | 7/2012 |
| CN | 202521218 U | 11/2012 |
| JP | 2000266292 A | 9/2000 |

\* cited by examiner

ENERGY EFFICIENT VERTICAL CRYOGENIC TANK

CROSS REFERENCE TO RELATED APPLICATION

This application is a national stage application, filed under 35 U.S.C. §371, of PCT Application No. PCT/CN2013/078852, filed on Jul. 5, 2013, entitled "An Energy-Efficient Vertical Cryogenic Tank," which claimed priority to Chinese Application No. 201320065885.4, filed on Feb. 5, 2013, all of which are hereby incorporated by reference in their entirety.

FIELD OF THE INVENTION

The present invention relates to the field of storage and use of cryogenic liquids, and in particular, to an energy-efficient vertical cryogenic storage tank for storing liquefied natural gas.

BACKGROUND

A cryogenic storage tank is a cryogenic container for storing liquefied natural gas (LNG), liquid nitrogen, liquid oxygen, and other products, which generally comprises a housing, an inner container, and a vacuum insulation interlayer disposed between the housing and inner container. Additionally, there are straps disposed between the housing and inner container in order to maintain the strength and stability of the inner container.

Daily evaporation rate of a cryogenic tank is generally 0.02%~0.08% when the tank is full. The better insulation is of the tank, the lower cooling loss, and the smaller evaporation rate; when the evaporation rate increases, the burden on the evaporation gas compressor and refrigeration system increases as well, which causes frequent re-starts, and as a result, increased energy consumption. The insulation effect of the vacuum insulation interlayer and the disposition of the straps are the main factors affecting the rate of evaporation.

The LNG stored in a cryogenic storage tank enters into the pump outside the tank body through a liquid outlet pipe provided on the tank body. Before LNG enters into the pump, if the pressure of saturation liquid decreases or the temperature increases, the liquid may be overly saturated so as to generate overflow bubbles, which will go with the flow of liquid from the low pressure side to the high pressure side of the pump. Under the high pressure, the bubbles are quickly condensed or ruptured, thereby causing pump cavitation that prevents the pump from normal operation, which will increase the operational cost and energy consumption. In other words, when more heat leaks into the area between the liquid outlet pipe and pump, the LNG temperature rises to the extent that LNG flashes before entering into the pump. As a result, the pump cavitation occurs, and so is cooling loss. If the gas (Boil off Gas, abbreviated BOG) that is formed as a result of gasification of LNG cannot be recycled effectively, it will further increase the waste of energy.

In addition, in order to achieve the desired saturation temperature during the use of LNG, there is a need to transport gas from an LNG vaporizer saturation adjustment mechanism into the LNG tank to facilitate rolling of the liquids in the tank. In existing technologies, the liquids in the LNG storage tank may flow backward into the pipeline so that the pipeline is filled with liquids over time, which results in an increase in BOG and subsequent diffusion, and further, significant waste of LNG.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

The present invention provides an energy-efficient vertical cryogenic tank, which, by using a saturation adjustment structure at an inlet of the air return pipe, can not only fully leverage the gasification gas produced at the pump, but also achieve the LNG saturation adjustment function inside the storage tank, with such benefits as reduced energy loss, simplified settings at the tank interface, improved efficiency of adjusting saturation and avoided pump cavitation.

In order to solve the problems above, the present invention adopted the following technical solutions:

An energy-efficient vertical cryogenic storage tank, comprising a tank body with a vacuum insulation interlayer, wherein the tank body comprises a transmitting means including an air return pipe and a liquid outlet pipe, and a positing means comprising supporting legs provided at the bottom of the tank body, and a built-in saturation adjustment mechanism comprising a heat exchanger connected to an inlet of the air return pipe and a return air dispersing device.

The heat exchanger is of a shape that is helical and coil-like, for which the radius of curvature increases in the radial and axial directions to form an inverted taper structure.

In a preferred embodiment, the return air dispersing device comprises a dispersion tube and shunt tube fittings to form a central radial network structure located in the inner wall of the tank body. There are uniform porosities whose outlets are directed vertically downward on the tubular body of the dispersion tube.

At the bottom of the tank is provided with a siphon package. In the siphon package, there are transmission devices including the air return pipe and the liquid outlet pipe. The inlet of the air return pipe and the outlet of the liquid outlet pipe are provided in the outer wall of the siphon package. The vacuum insulation interlayer of the siphon package is connected with the interlayer of the tank body.

At the bottom of the tank is an insulation compartment housing a submersible pump that matches the siphon package. The insulation compartment has a vacuum insulation interlayer. The liquid outlet of the siphon package is connected with the submersible pump in the insulation compartment through an insulated pipe. The air return pipe of the submersible pump is connected with the return air inlet of the siphon package through the coil pipe located between the siphon package and the insulation compartment.

In the above-stated technical solutions, the gasification gas produced at the pump flows into the cryogenic liquid in the tank through the air return pipe and the saturation adjustment mechanism. The high temperature of the gasification gas increases the saturation of cryogenic liquid. As a result, the saturated vapor pressure of cryogenic liquid flowing out of the liquid outlet pipe is higher than usual, thus avoiding the occurrence of cavitation in the pump. Moreover, the gasification gas produced at the pump is recycled and reused as much as possible.

Benefits of the above-proposed technical solutions include: (1) using a saturation adjustment mechanism at the outlet of the air return pipe enables a recycled use of the LNG and reduces the volatilization waste of the LNG, thereby lowering energy consumption; (2) the saturation adjustment mechanism increases the saturation vapor pressure of the LNG, and thus maximally avoids pump cavitation and reduces operational costs and energy consumption; in particular, the saturation adjustment mechanism has a radiation type of pipe with venting apertures, which improves the efficiency of saturation adjustment; (3) braided straps are adopted to increase the strength of the tank on one hand, and on the other hand, reduce the cooling loss; (4) an insulation compartment with a vacuum insulation interlayer is adopted so that cryogenic liquid from the liquid outlet pipe through the insulation tube can enter into the insulation compartment directly, which allows for a good insulation of the cryogenic liquid to ensure that the cryogenic liquid into the pump is in a super-cooled state, thereby avoiding any cavitation damage to the pump at the time of starting the pump as well as the resulting economic loss.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

The above-referenced figures include: 1. tank body; 1-1. housing; 1-2. container; 2. braided straps; 5. supporting legs; 6. siphon package; 7. insulation compartment; 8. heat exchanger; 9. dispersion tube; 10. liquid outlet pipe; 11. insulated pipe; 12. coil pipe; 13. access door; 14. air return pipe.

DETAILED DESCRIPTION OF EXEMPLARY EMBODIMENTS

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

Figure 1:
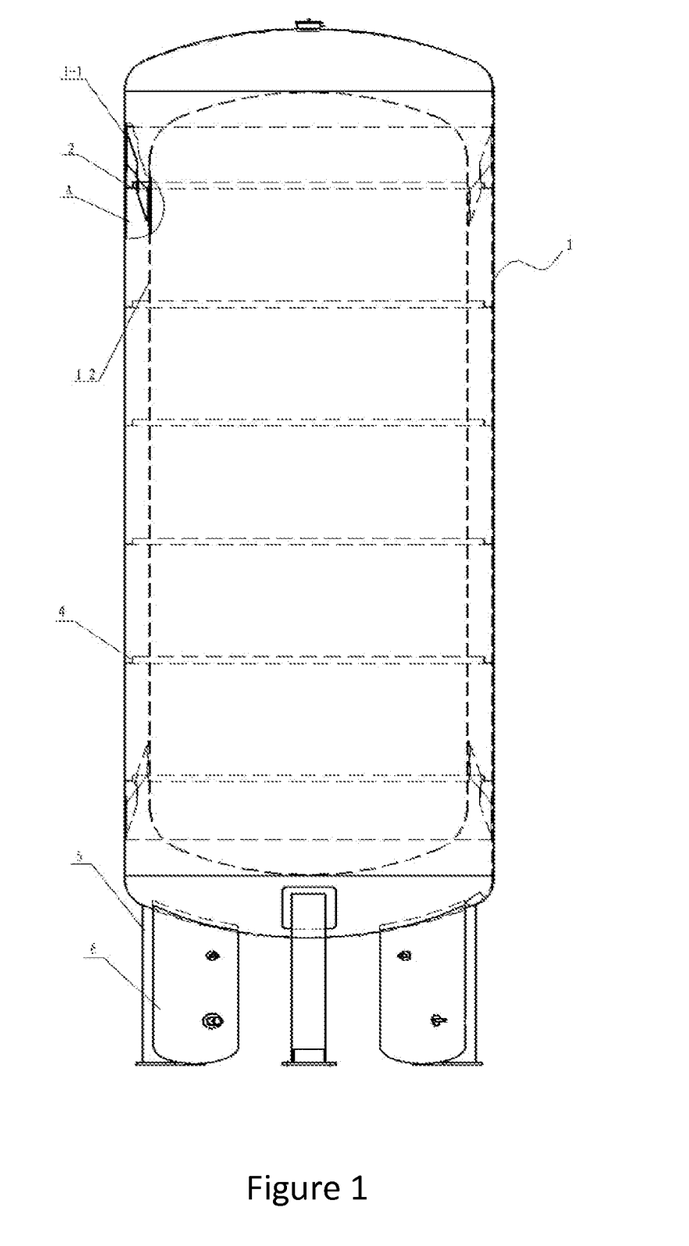
FIG. 1 is a partial cross-sectional schematic view of the first embodiment of the present invention.
Figure 3:
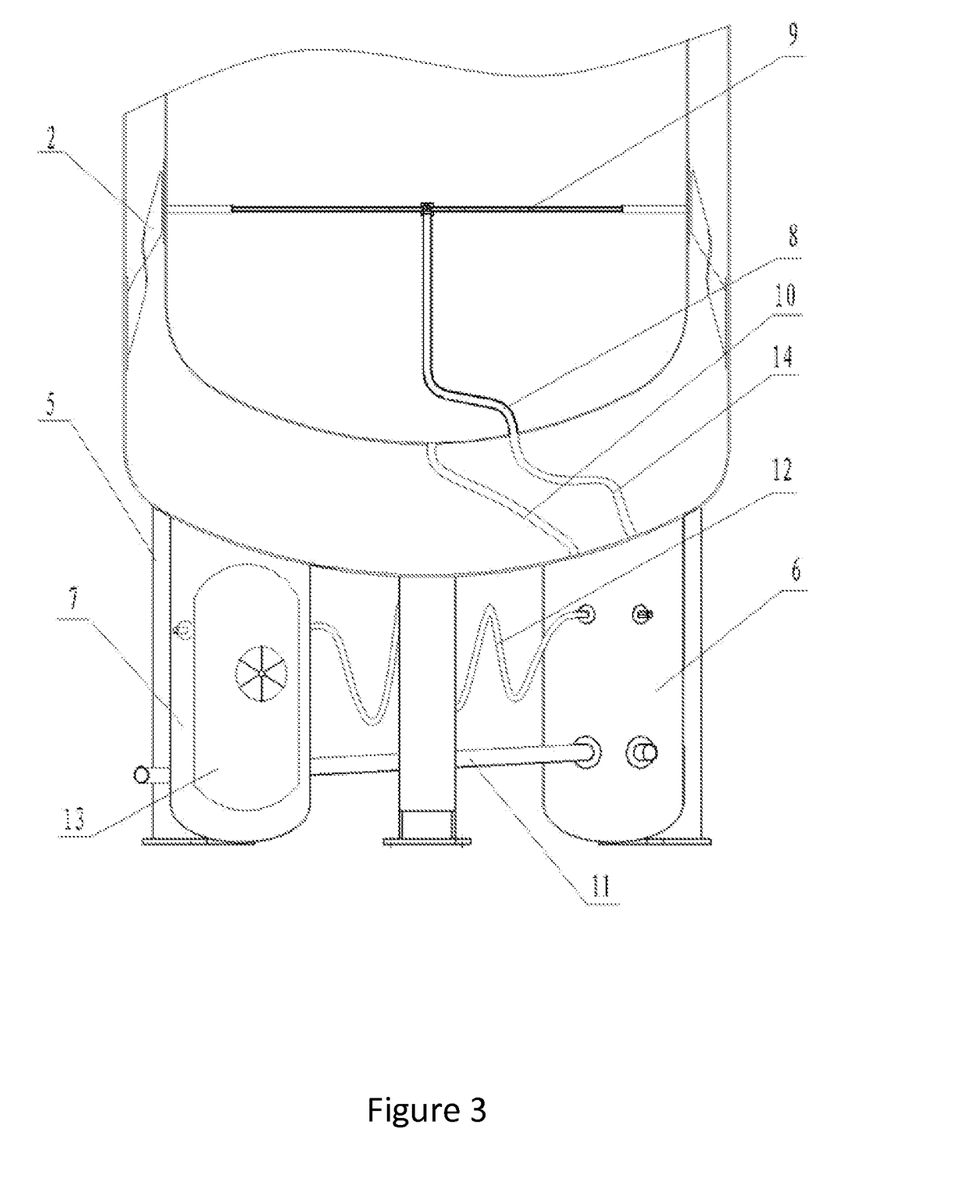
FIG. 3 is a cross-sectional schematic view of the second embodiment of the present invention.
Figure 4:
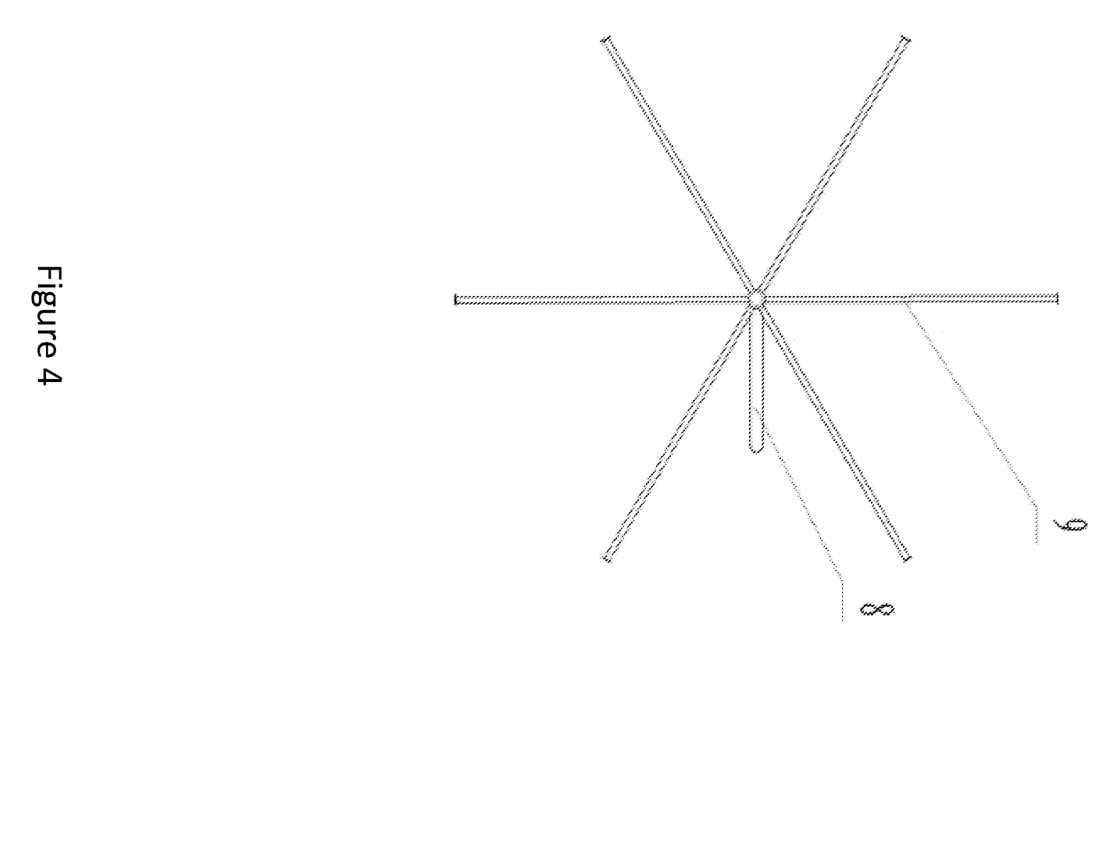
FIG. 4 is a plan schematic view of the saturation adjustment mechanism in FIG. 3.

FIG. 1 illustrates the first embodiment of the present invention featuring a vertical cryogenic tank, comprising a tank body 1 with a vacuum insulated interlayer. The tank body 1 has transmission means including an air return pipe 14 and a liquid outlet pipe 10 at the bottom of the tank body. There are also supporting legs 5 provided at the bottom of the tank body 1. The tank further includes a built-in saturation adjustment mechanism comprising a heat exchanger 8 connecting to the inlet of the air return pipe 14 and a return air dispersing device. The return air dispersing device is comprised of a dispersion tube 9 and shunt tube fittings to form a central radial network structure located in the inner wall of the tank body. There are uniform porosities whose outlets are directed vertically downward on the tubular body of the dispersion tube 9. In the present embodiment, the heat exchanger 8 is linear with a curved connection. FIG. 3 and FIG. 4 present specific structures of the heat exchanger 8 and the dispersion tube 9.

Figure 2:
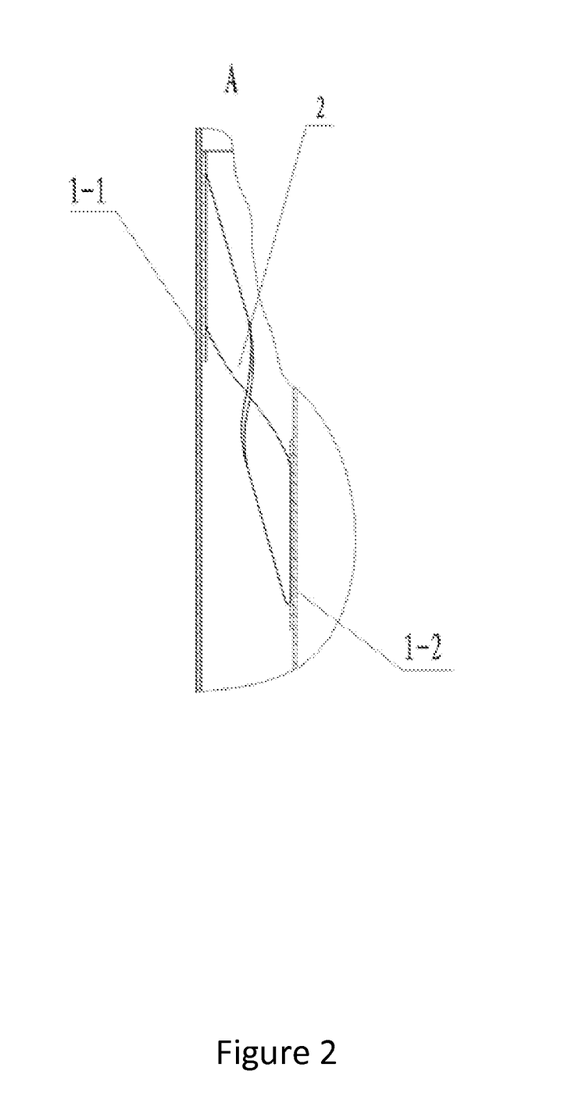
FIG. 2 is an enlarged view of A in FIG. 1.

The tank body 1 comprises a housing 1-1, a container 1-2 and a vacuum insulation interlayer disposed between the housing 1-1 and the container 1-2. In the interlayer between the housing 1-1 and the container 1-2 are braided straps 2 that are positioned axially and uniformly along the circumferential direction of the tank body 1. The braided straps 2 are symmetrically positioned along the radial symmetric plane of the tank body 1 to form a two-way cable-stayed structure, as shown in FIG. 2. Braided straps 2 are made of 10~30° twisted steel strips that are secured by means of jaws between the inner wall of the housing 1-1 and the outer wall of container 1-2. Cryogenic tanks are usually transported horizontally, and the up-and-down bump and shake of the transport vehicle, as well as any engine-start and brake during transportation may cause the container 1-2 to vibrate up and down, or move forward and backward. The braided straps 2 can reduce vibration in the vertical direction, and on the other hand, turn the shearing force of straps caused by the forward and backward movement into a tensile force, thereby enhancing the strength of the tank. In this embodiment, about four to eight groups of braided straps 2 can be adopted to achieve the required strength of the tank body, which reduces the number of thermal bridges and lowers the cooling loss.

A siphon package 6 is provided at the bottom of the tank body 1. In the siphon package 6, there are transmission devices including the return pipe 14 and outlet pipe 10. The inlet of the return pipe 14 and outlet of the outlet pipe 10 are provided on the outer wall of the siphon package 6. The siphon package 6 has a vacuum insulation interlayer that is connected with the interlayer of the tank body 1. With such vacuum insulation interlayer, the siphon package 6 can prevent the LNG in the liquid outlet pipe from rapid vaporization, which vaporization can increase the pressure in the outlet pipe so that the LNG in the tank body 1 cannot flow out smoothly or the pump outside the tank cannot function normally. The siphon package 6 with the vacuum insulation interlayer can also reduce the cooling loss and the waste of LNG.

The LNG flowing out of the liquid outlet pipe 10 passes through an external insulated tube connected to the pump to prevent heat leakage, reduce the probability of pump cavitation as well as the loss of cooling power and energy consumption. The BOG generated at the pump body enters into the inlet of the air return pipe through a single conduit exposed to the air. The BOG is discharged from the dispersion tube 9 after its temperature and barometric pressure increase in the air and then passes the outlet of the air return pipe and the heat exchanger 8. On one hand, this increases the saturation vapor pressure in the tank body 1, and on the other hand the recycled use of BOG reduces energy consumption. Referring to FIG. 3, the dispersion pipe 9 is symmetrically distributed and axially along the radial direction of the center of the tank 1 body. This configuration allows the reflux gas to be discharged to the LNG uniformly so that part of the gasification gas is liquefied during the reflow process and the saturated vapor pressure will not rise rapidly.

In other embodiments, at the bottom of the tank body 1 there can be one to three siphon packages 6, each of which is coupled with the matching submersible pump, insulation pipe, air return pipe, and valves to form an independent liquefied gas loop.

Second Embodiment

Referring to FIG. 3, different from the first embodiment: at the bottom of the tank body 1, there is an insulation compartment 7 within which is the submersible pump that matches the siphon package 6, The insulation compartment 7 has a vacuum insulation interlayer. The outlet of the siphon package 6 is connected with the submersible pump device in the insulation compartment 7 through the insulated pipe 11, and the air return pipe of the submersible pump device is connected with the return air inlet of the siphon package 6 through the coil pipe 12 positioned between the siphon package 6 and insulation compartment 7. The siphon package 6 and insulation compartment 7 adopt a double-walled structure in their vacuum insulation interlayers to maximize the insulation effect. As a result, the LNG flowing out the liquid outlet pipe goes through the siphon package 6 and insulated pipeline 11 to enter into the insulation compartment 7 with good insulation effect, which avoids any heat leakage at the maximum. Moreover, the structure is simple without additional pump or any supplemental facilities such as a thermal insulation system of the pump in order to provide an LNG supply with high efficiency and low energy consumption, making it suitable for any emergency use. After being fully preheated in the coil pipe 12, the evaporated gas from the insulation compartment 7 enters into the tank body 1 through the return pipe for purposes of adjusting the saturation.

The insulation compartment 7 has an access door 13 with a vacuum insulation interlayer. Such interlayer of the access door 13 is connected with the sealed insulation interlayer of the insulation compartment 7 through the vacuum insulation pipe. It is configured with an independent vacuum interface. When the pump in the insulation compartment 7 needs to be repaired, the repair and maintenance can be done by simply opening the access door 13 with no need to disrupt the vacuum system in the insulation compartment.

Figure 5:
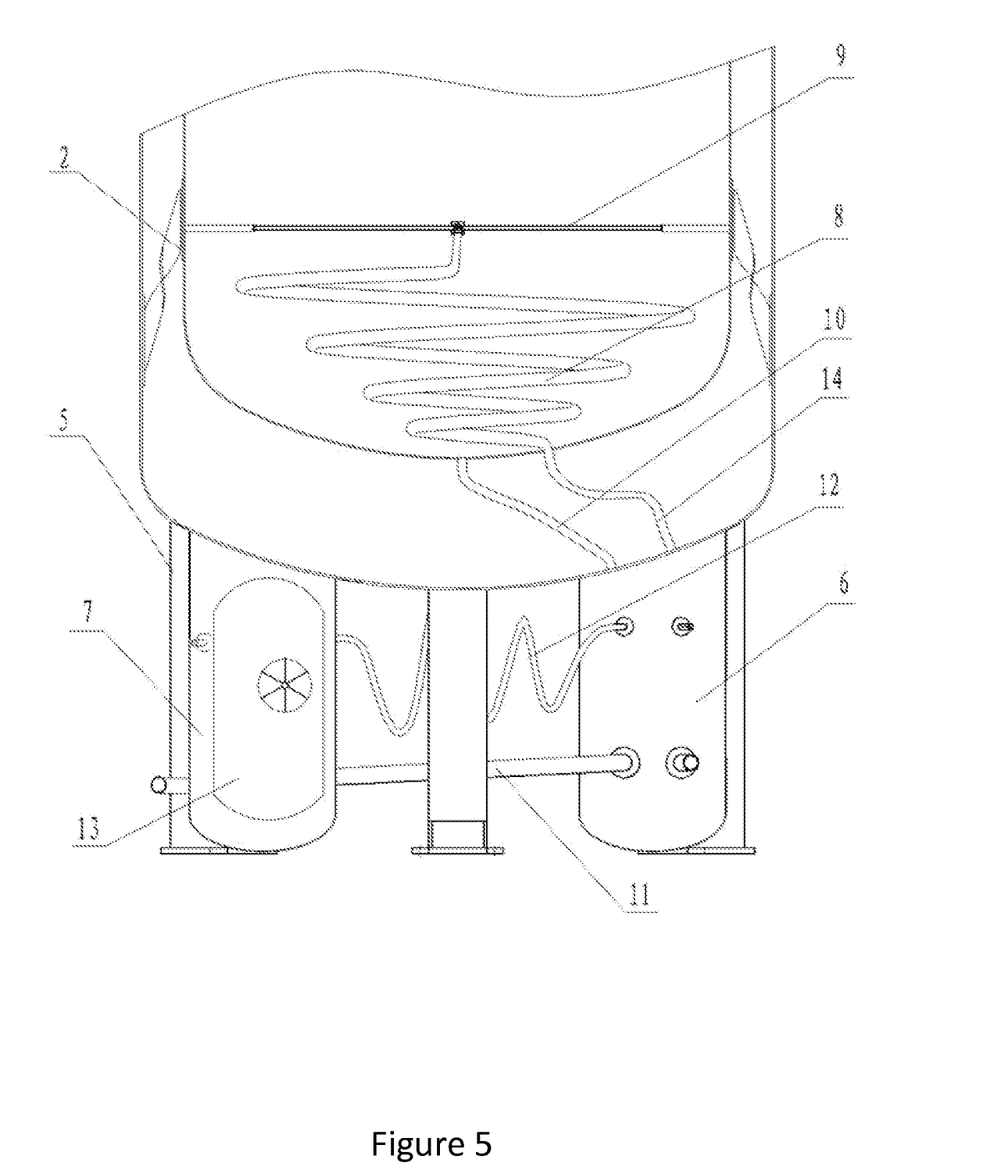
FIG. 5 is a partial cross-sectional schematic view of the third embodiment of the present invention.

FIG. 5 is the third embodiment of the present invention. Unlike the above-described second embodiment, the heat exchanger 8 is of a shape that is helical or coil-like, for which the radius of curvature evenly increases along the radial and axial direction to form an inverted taper structure. Spiral heat exchangers can enhance the cooling of the recirculation gas and improve the saturation efficiency.

In other embodiments, the spiral heat exchanger 8 is configured with venting apertures starting from one (1) meter above from the inner bottom of the tank body 1.

In sum, through a combined use of the saturation adjustment mechanism, siphon package, and insulation compartment as well as an improved structure of straps, the present invention provides a cryogenic tank with low energy consumption, high energy efficiency and aseismic stability.

What is claimed is:

1. An energy-efficient vertical cryogenic storage tank, comprising:
   a tank body (1) with a vacuum insulation interlayer, said tank body having transmission means including an air return pipe (14) and a liquid outlet pipe (10), and positioning means comprising supporting legs (5) at a bottom of the tank body (1); and
   a built-in saturation adjustment mechanism formed by a heat exchanger (8) connected with an inlet of said air return pipe (14) and a return air dispersing device, wherein said return air dispersing device comprises a dispersion tube (9) and shunt tube fittings in the form of a central radial network structure located in an inner wall of the tank body, said dispersion tube (9) having a tubular body configured with uniform porosities having outlets in a vertically downward direction.

2. The energy-efficient vertical cryogenic storage tank according to claim 1, wherein the heat exchanger (8) is of a helical and coil-like shape, for which the radius of curvature evenly increases along radial and axial directions to form an inverted taper structure.

3. The energy-efficient vertical cryogenic storage tank according to claim 2, wherein the heat exchanger (8) is configured with venting apertures starting from one (1) meter above from the inner bottom of the tank body (1).

4. The energy-efficient vertical cryogenic storage tank according to claim 1, wherein the bottom of the tank body (1) is configured with a siphon package (6), and within the siphon package (6) is the transmission means including the air return pipe (14) and the liquid outlet pipe (10), and wherein an inlet of the air return pipe (14) and an outlet of the liquid outlet pipe (10) are provided in an outer wall of the siphon package (6), said siphon package (6) having a vacuum insulation interlayer connected with the vacuum insulation interlayer of the tank body (1).

5. The energy-efficient vertical cryogenic storage tank according to claim 4, wherein the bottom of the tank body (1) is configured with one to three siphon packages (6), each of which being coupled with a matching submersible pump, insulation pipe, air return pipe, and valves to form an independent liquefied gas loop.

6. The energy-efficient vertical cryogenic storage tank according to claim 4, wherein the bottom of the tank body (1) is provided with an insulation compartment (7) housing a submersible pump that matches the siphon package (6), wherein said insulation compartment (7) has a vacuum insulation interlayer, a liquid outlet of the siphoning package (6) is connected to a submersible pump in said insulation compartment (7) through an insulation pipeline (11), and a return pipe of the submersible pump is connected with an air return inlet of the siphoning package (6) through a coil pipe (12) located between the siphoning package (6) and the insulation compartment (7).

7. The energy-efficient vertical cryogenic storage tank according to claim 6, wherein the insulating compartment (7) is configured to include an access door (13) with a vacuum insulation interlayer, said insulation interlayer of said access door is connected with the vacuum insulation interlayer of the insulation compartment (7) through an insulation pipe and configured with a separate vacuum interface.

8. The energy-efficient vertical cryogenic storage tank according to claim 1, wherein the tank body (1) comprises a housing (1-1), a container (1-2), the vacuum insulation interlayer disposed between the housing (1-1) and the container (1-2), and braided straps (2) fixed axially and uniformly along a circumferential direction of the tank body (1) in the vacuum insulation interlayer between the housing (1-1) and the container (1-2), wherein the braided straps (2) are symmetrically distributed along a radial direction of a center of the tank body (1) to form a two-way cable-stayed structure.

* * * * *